United States Patent Office 3,073,859
Patented Jan. 15, 1963

3,073,859
PROCESS FOR THE PREPARATION OF S-VINYL PHOSPHORODITHIOATES
Philip J. Paré, Yorktown Heights, N.Y., assignor to American Cyanamid Company, New York, N.Y., a corporation of Maine
No Drawing. Filed Sept. 21, 1961, Ser. No. 139,599
7 Claims. (Cl. 260—461)

The present invention relates to a novel process for preparing S-vinyl phosphorodithioates represented by the general formula:

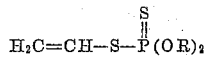

in which R is a lower alkyl radical.

Phosphorothioate compounds prepared by the process of the present invention which have the general grouping:

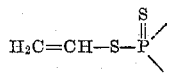

find utility as pesticides, particularly as insecticides and as valuable intermediates. Advantageously, they are prepared by admixing an inert organic solvent and O,O-dialkyl phosphorodithioic acid having the representative structure:

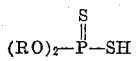

wherein R is a lower alkyl radical, and approximately equimolar quantities of acetylene gas in the presence of a free radical catalyst.

Reaction occurs within a wide range of superatmospheric pressures, usually from about 100 p.s.i. to about 500 p.s.i., and at temperatures from about 50° C. to about 250° C., and preferably from about 150° C. to about 200° C.

Several contemplated O,O-dialkyl phosphorodithioates, which can be employed herein, are:

O,O-dimethyl phosphorothioate,
O,O-diethyl phosphorothioate,
O,O-di-n-propyl dithiophosphorothioate,
O,O-dibutyl dithiophosphorothioate,
O,O-dipentyl dithiophosphorothioate,
O,O-dihexyl dithiophosphorothioate,
O,O-diheptyl dithiophosphorothioate, and isomers thereof.

Illustrative free radical catalysts suitable for use herein are:

Di-tert-butyl peroxide,
Benzoyl peroxide,
Azobisisobutyronitrile, and equivalents thereof.

Suitable inert solvents for the aforementioned reaction include:

Hexane
Cyclohexane
Dioxane
Ether
Benzene
Xylene
Toluene
Dimethylformamide and equivalents thereof.

The compounds prepared by the process of the present invention are active insecticides and may be used as sprays in organic solvents, as emulsions in water or other non-solvents, or on solid carriers, such as talc, clays, diatomaceous earths and the like. Such amounts of inert carrier may be incorporated as are customarily employed in the art. However, the active pesticidal compound is advantageously present in amounts ranging from about 0.1% to about 5%, based on the weight of the inert carrier. The S-vinyl phosphorodithioate compounds may further react with mercaptans, such as methyl mercaptan, ethyl mercaptan, phenyl mercaptan, and the like, to form corresponding thioethers.

In order to facilitate a further understanding of the invention, the following examples are presented primarily for purposes of illustrating more specific details thereof. It is to be understood, however, that the scope of the invention is not to be deemed limited thereby, except as defined in the claims. Unless otherwise noted, parts given are by weight.

EXAMPLE 1

*Preparation of O,O-Diethyl S-Vinyl Phosphorodithioate*

A suitable stainless steel rocking autoclave is charged with 98 parts of diethyl phosphorodithioic acid, 73 parts of benzene and 2 parts of di-tert-butyl peroxide. After sealing, the clave is purged with nitrogen, evacuated and pressured with 100 p.s.i. of acetylene gas. The autoclave is rocked and heated to 150° C. where addition acetylene gas is pressured in to allow a total pressure in the system to reach 375 p.s.i. As reaction occurs and acetylene is absorbed, further additions of acetylene are necessary over a two-hour period. Reaction terminates when no pressure variation is noted. Following reaction, the autoclave is cooled. Residual gases are vented. The crude product totaled 179 parts. After removal of the benzene solvent, 64 parts of O,O-diethyl S-vinyl phosphorodithioate are distilled over at a boiling point of 62–64° C./0.1 mm. Hg. The index of refraction of the distillate is 1.512 at 27° C. The recovery of product corresponds to a 61% conversion of the starting acid.

Calculated for $PS_2O_2C_6H_{13}$: C, 49.90; H, 5.94; S, 22.20; P, 10.73. Found: C, 50.35; H, 6.20; S, 22.45; P, 10.98.

EXAMPLE 2

*Preparation of O,O-Dimethyl S-Vinyl Phosphorodithioate*

Repeating Example 1 in every detail except that the clave is charged with 47 parts of distilled dimethyl phosphorodithioate acid, 35 parts of benzene and 1.0 part of di-t-butyl peroxide. After reaction as in Example 1, 89 parts of reaction product are recovered. 7.5 parts of S-vinyl O,O-dimethyl phosphorodithioate are distilled at a boiling point of 62–63° C./0.7 mm. Hg. The refractive index of the product is 1.527 at 27° C. The conversion of starting acid to vinyl ester is 35% and analyzes as follows:

Calculated for $PS_2O_2C_4H_9$ in percent: C, 26.05; H, 4.92; S, 34.7. Found: C, 26.38; H, 5.20; S, 35.03.

EXAMPLE 3

*Preparation of O,O-Diisopropyl S-Vinyl Phosphorodithioate*

An autoclave as employed in Example 1 above, is charged with 64 parts of diisopropyl phosphorodithioic acid, 55 parts of benzene and 1.5 parts of di-t-butyl peroxide. The reaction is as set forth in Example 1 above. The reaction product consists of 108 parts from which are distilled 22 parts of O,O-diisopropyl S-vinyl phosphorodithioate boiling at 66° C.–69° C./0.1 mm. Hg. The conversion of acid to vinyl ester is 32%, analyzing as follows:

Calculated for $PS_2O_2C_8H_{17}$ in percent: C, 40.00; H, 7.08; S, 26.66. Found: C, 40.15; H, 7.37; S, 26.52.

EXAMPLE 4

*Preparation of O,O-Diethyl S-Vinyl Phosphorodithioate*

A suitable stainless steel rocking autoclave is charged with 40 parts of diethyl phosphorodithioic acid, 55 parts benzene and 1.0 part of benzoyl peroxide. After sealing, the clave is purged with nitrogen, evacuated and pressured with 100 p.s.i. of acetylene gas. The autoclave is rocked and heated to 95° C. where additional gas is pressured in to allow a total pressure of 350 p.s.i. in the vessel. The temperature is held at 95° C.–98° C. for a two hour reaction period. The clave is next cooled, vented of residual gases and emptied. After removal of the benzene solvent, O,O-diethyl S-vinyl phosphorodithioate is recovered in 20% yields.

EXAMPLE 5

*Preparation of O,O-Diethyl S-Vinyl Phosphorodithioate*

The procedure of Example 4 is followed in every material respect except that the autoclave is charged with 40 parts of diethyl phosphorodithioic acid, 55 parts of benzene and 2.5 parts of azobisisobutyronitrile. The reaction is carried out at 80° C. for two hours at a total clave pressure of 350 p.s.i. The recovery of O,O-diethyl S-vinyl phosphorodithioate corresponds to an 18% conversion of initial starting acid.

EXAMPLE 6

Repeating Example 1 in every material detail except that the clave is heated to 180° C., held at that temperature over a fifteen minute period and then cooled to room temperature over a one hour period. A 28% yield of O,O-diethyl S-vinyl phosphorodithioate based on starting acid is obtained.

EXAMPLE 7

As above stated, the compounds of the present invention are highly active and effective insecticides. To demonstrate the marked degree of insecticidal activity, each of the products of the above examples are dissolved in a solvent therefor comprising 65 percent acetone and 35 percent water at a concentration of 0.1 percent based on the weight of the compound. The solution is sprayed on Nasturtium aphids and the results of the tests are presented in the table below.

TABLE I

| Compound: | Percent kill |
|---|---|
| O,O-dimethyl S-vinyl phosphorodithioate | 100 |
| O,O-diethyl S-vinyl phosphorodithioate | 100 |
| O,O-diisopropyl S-vinyl phosphorodithioate | 98 |

I claim:

1. A method for preparing phosphorodithioates represented by the general formula:

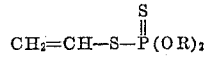

wherein R is a lower alkyl radical which comprises: reacting under superatmospheric pressure from about 100 p.s.i. to about 500 p.s.i. and elevated temperature from about 50° C. to about 250° C. in substantially equimolar amounts of acetylene and an O,O-dialkyl phosphorodithioic acid of the structure:

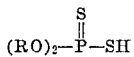

where R is a lower alkyl radical, in the presence of a free radical catalyst.

2. A process according to claim 1, in which the free radical catalyst is di-tert-butyl peroxide.

3. A process according to claim 1, in which the free radical catalyst is benzoyl peroxide.

4. A process according to claim 1, in which the free radical catalyst is azobisisobutyronitrile.

5. A process according to claim 1, in which the phosphorodithioic acid is O,O-dimethyl phosphorodithioic acid.

6. A process according to claim 1, in which the phosphorodithioic acid is O,O-diethyl phosphorodithioic acid.

7. A process according to claim 1, in which the phosphorodithioic acid is O,O-diisopropyl phosphorodithioic acid.

References Cited in the file of this patent

UNITED STATES PATENTS

| 2,864,741 | Diveley | Dec. 16, 1958 |
| 2,912,450 | McConnell et al. | Nov. 10, 1959 |
| 2,976,308 | Bacon | Mar. 21, 1961 |

OTHER REFERENCES

Groggins: "Unit Processes in Organic Synthesis," 5th ed. (1958), McGraw-Hill Book Co., New York, pages 597, 824, 825.